March 12, 1940.　　　W. ELLIOTT　　　2,193,275
DAMMER ATTACHMENT FOR FURROW SEEDERS
Filed May 9, 1938　　　2 Sheets-Sheet 1
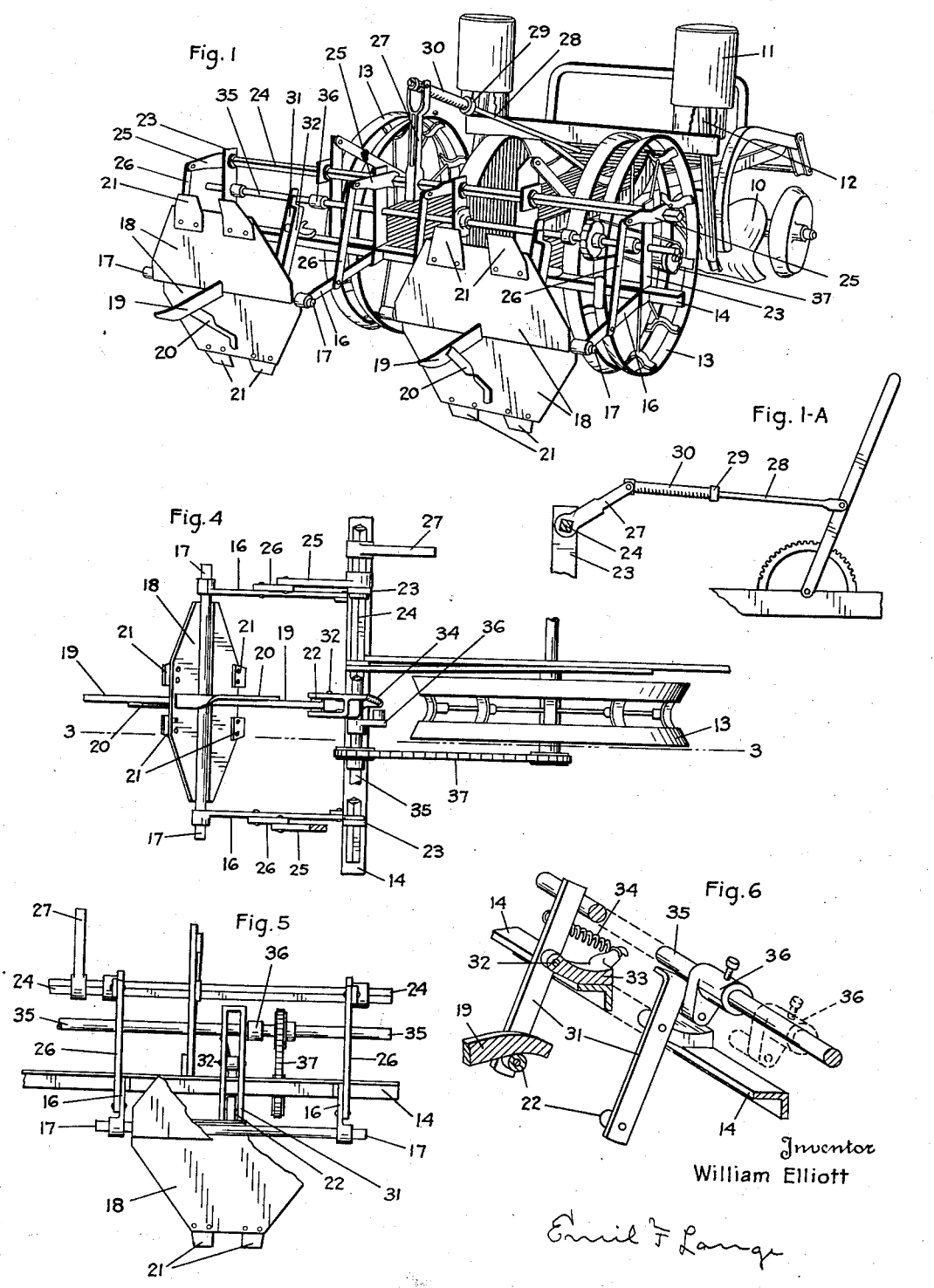
Inventor
William Elliott March 12, 1940.   W. ELLIOTT   2,193,275
DAMMER ATTACHMENT FOR FURROW SEEDERS
Filed May 9, 1938   2 Sheets-Sheet 2
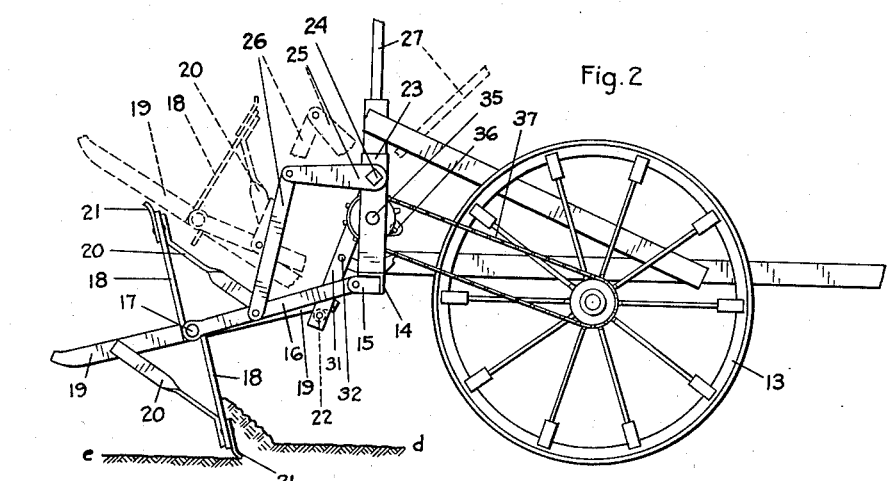
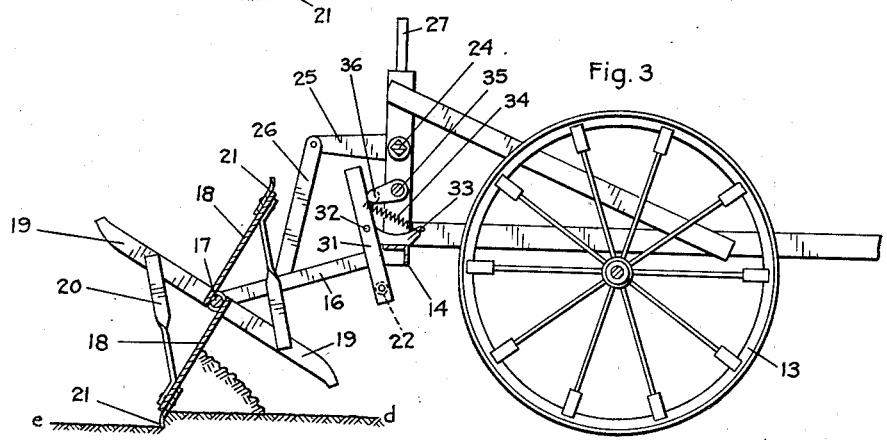
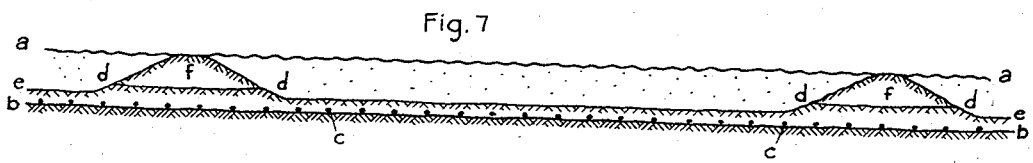
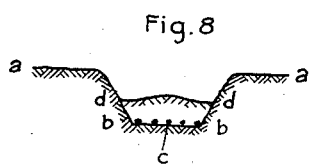
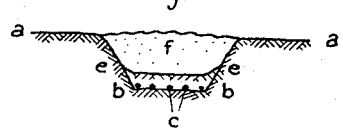
Inventor
William Elliott Patented Mar. 12, 1940

2,193,275

UNITED STATES PATENT OFFICE 2,193,275

DAMMER ATTACHMENT FOR FURROW SEEDERS

William Elliott, Beatrice, Nebr., assignor to Dempster Mill Manufacturing Company, Beatrice, Nebr., a corporation of Nebraska Application May 9, 1938, Serial No. 206,841

10 Claims. (Cl. 97—55)

My invention relates to implements for forming spaced apart dams in furrows, the primary object of the invention being to provide an attachment for seeders to complete the seeding operation by leaving the seed bed in the best possible condition through the conservation of soil water for the germination and growth of the seed and the plants.

Another object is the provision of an attachment to a furrow planting implement to follow the planting mechanism for building dams in the planted furrows without disturbing the seed bed.

Another object is the provision of a dammer in the form of a reel consisting of a shaft and alternately arranged radial scraper blades and walking bars, the walking bars being in the vertical planes of the bottoms of the furrows.

Another object is the provision of a dammer in the form of a reel consisting of a shaft and alternately arranged radial scraper blades and walking bars, and latches cooperating with the walking bars for holding the reel against rotation, with latch releasing means responsive to the travel of the implement.

Another object is the provision of a dammer consisting of scrapers for dragging the soil forwardly with tripping mechanism for periodically dumping the soil in the form of dams, the tripping mechanism being responsive to the travel of the implement and being adjustable for either the transverse alignment or nonalignment of the dams.

Figure 1 is a view in rear perspective showing the two-unit form of my dammer attached to a two-row lister seeder, the seeder being shown in outline only and only as illustrative of any seeding machine or in fact of any furrow forming implement.

Figure 1A is a side elevational view of a hand lever and rack as applied to the damming mechanism.

Figure 2 is a view in side elevation of the damming attachment and of one of the presser wheels of the furrow forming or seeding implement.

Figure 3 is a sectional view of some of the parts shown in Figure 2 but showing particularly the action of the dammer immediately after it has been tripped.

Figure 4 is a plan view of one of the dammer units and showing the connections and the operating mechanism for tripping the blade.

Figure 5 is a view in rear elevation of the parts shown in Figure 4.

Figure 6 is a view in isometric projection showing particularly the tripping mechanism for tripping the dammer blade.

Figure 7 is a view in longitudinal vertical section showing diagrammatically a furrow in the soil with two dams in the furrow, the figure showing particularly the approximate areas of the dammed and undammed portions of the furrow and the relative position of the planted seed and the dams.

Figure 8 is a view in transverse section of a furrow as it appears immediately after the presser wheel has passed thereover and before the dammer has reached that point.

Figure 9 is a view similar to Figure 8 but showing the contour of the furrow after the dammer has operated thereon.

The furrow forming implement shown in Figure 1 is the ordinary two-row lister planter but this implement is illustrated merely for the purpose of showing the relation between the furrow forming implement and the damming attachment which is adapted for use not only with lister planters but with furrow seeding machines and in fact with any furrow forming implements. The one illustrated in Figure 1 includes furrow formers 10, seed receptacles 11, and conduits 12 for conveying the seed from the receptacles 11 to the lowest part of the furrow which is being formed by the furrow openers 10. As is well known to those skilled in the art, the seed is dropped into the bottom of the furrow and is immediately covered up by a layer of loose soil above the seed. Such implements usually have presser wheels for compacting the damp soil above the seed thus completing the seeding operation. The presser wheels in the present instance are of the open type bevelled flange packer wheels which readily compact the loose soil without accumulating wet soil to disturb the operation of the implement. The presser wheels 13 must naturally follow the furrow openers 10 and be in alignment therewith in the line of draft.

At the rear of the furrow forming implement is a frame 14 of angle iron extending transversely across the furrow forming implement. This frame 14 individually supports the dammer units as shown in Figure 2. Ears 15 project rearwardly from the frame 14, the ears being in pairs for the pivotal connection thereto of pairs of drag bars 16. Each pair of drag bars supports an axle 17 for the dammer units. Each of these dammer units is in the form of a reel each consisting of two dammer blades 18 and a walking bar having two operative end portions 19, the blades 18 being braced to the walking bar 19 by means of the braces 20. At the operative edges of the dammer blades 18 are dammer shovels 21, these being made removable or replaceable. The dammer blades and walking bars rotate as a unit about the axis of the axle 17. While one of the blades 18 is building up the dam in the furrow, the reel is held against rotation by an abutment 22 which is operative against the outer curved end of a walking bar 19.

Arising from the frame bar 14 are standards 23, there being a pair of standards 23 for each dammer unit. The square shaft 24 extends transversely across the damming implement and is journalled in all of the standards 23. The shaft 24 carries levers 25 in the vertical planes of the drag bars 16 to which they are connected through links 26. The turning of the shaft thus elevates or lowers all of the dammer units as shown in dotted lines in Figure 2. The single lever 27 is also secured to the shaft 24, this being the operating lever for the shaft. As shown in Figure 1, the lever 27 is forked at its upper end for the reception of a link 28 the forward end of which is connected to any suitable means for applying tension combined with means for latching such as the ordinary lifting lever employed in farm implements together with a latch for holding the lever in adjusted position, all as shown in conventional form in Figure 1A. The link 28 has a fixed collar 29, there being a coiled spring 30 surrounding the link between the fork of the lever 27 and the collar 29. The elevation of all of the dammer units may thus be fixed for depth by the connections permitting play when crossing ditches. By means of the spring 30, pressure may be put on the dammer blades to control the height of the dams. The dammer units are usually so positioned that they are on a level with the flanges of the presser wheel, for reasons to be pointed out later.

The abutment 22 holds the dammer blades in operative position while the dam is being built up but means are also provided for periodically tripping the dammer. The abutment 22 is in the form of a roller which is journalled in the lower end portions of a slotted lever 31. This lever is pivotally connected at 32 to a rearwardly projecting arm of a bracket 33. Between the lever 31 and the forwardly projecting arm of the bracket 33 is a tension spring 34 which normally holds the roller 22 in position to be engaged by the walking bar 19. In order to trip the device by releasing the walking bar 19 from its abutment 22, there is provided a shaft 35 which is journalled in all the standards 23. The shaft 35 carries a plurality of trip arms or cranks 36 which are preferably secured to the shaft by any suitable releasing means such as set screws as shown in Figure 6. The rotation of the shaft 35 causes pivotal movement of the levers 31 and this movement carries the abutment rollers 22 beyond the free extremities of the walking bars 19. Thereafter, the entire dammer unit is rotated about shaft 17 by the forward movement of the implement until the rollers 22 have been released, whereupon the rotation of the dammer unit will be stopped by the walking bars again engaging the rollers. The trip arms 36 are both slidable and rotatable on the shaft 35 which makes possible several desirable adjustments. When it is desired to stop the movement of the trip arms 36 as when adjusting the implement to its inoperative position as shown in dotted lines in Figure 2, the trip arms are released and moved into a position such as that shown in dotted lines in Figure 6. If it is desired to form all of the dams in transverse alignment in the furrows, then all the trip arms 36 are adjusted so that they all point in the same direction. If it is desired to stagger the dams in the furrows, the trip arms 36 are adjusted accordingly. This makes possible a very wide range of adjustments. Rotation is imparted to the shaft 35 by means of sprocket connections 37 between the axle of a wheel 13 and the shaft 35.

The above described damming attachment is designed particularly for use on any kind of seeding implement such as the lister planter shown in Figure 1 or the lister type furrow seeder in which the seed is scattered in the bottoms of relatively wide furrows as shown in Figures 8 and 9. In any case, the furrow openers are followed immediately by the means for dropping the seed so that the seed will fall into the lowermost part of the furrow. After the furrow has been opened, the loose and friable soil will fall or be carried to the bottom of the furrow to cover the seed but this soil will immediately be packed by the action of the packer wheels 13. Following the packer wheels is the dammer blade which shaves off the top layer of the soil in the bottom of the furrow to form dams at spaced apart points. In Figures 7, 8, and 9 the line a—a indicates the level of the tops of the ridges while the line b—b indicates the path of the point of the furrow opener and the surface on which the seed e is deposited. The surface of the soil which is carried down from the sides of the furrow assumes the convex form which is indicated by the line d—d after the packer wheels have traveled over the loose soil. This is followed immediately by the dammer blade which by reason of its being on substantially the same level as the flanges of the presser wheel, acts as a scraper to shove the soil to the level indicated by the line e—e to be intermittently dumped to form the dams f. The slope of the forward and rear walls of these dams will depend very largely on the angle of repose of the soil forming the dams.

The dimensions of the furrows and dams depend largely on the type of seeding implement employed. In the case of the lister type furrow seeding machine for small grains, the height of the ridges above the bottoms of the furrows or the vertical height between the levels a and b is about four inches which represents also the height of the dam. The dams are spaced on an average of about seven feet apart but this distance may be altered by using different sprockets to meet special conditions of soil. In the case of the lister planters, the depth of the furrows is from eight to ten inches, and the furrows are in substantially V shape, they being very narrow at the bottom. The seed in such furrows is usually deposited in a narrow line as is true also of the ordinary drill for small grains. In any case, however, the quantity of seed covered by the dams is very small in comparison with the total amount of seed planted. If the seed has the requisite vitality, there will be ample moisture for not only germinating the seed but for facilitating the growth through the larger part of the dam so that practically no seed is wasted by being covered by the dams.

The shovels 21 are particularly useful in connection with implements which deposit the seed in narrow lines. The shovels are spaced apart to straddle the seed row so as not to disturb or disarrange the seed in the bottom of the furrow. The primary object of the shovels is the provision of a wearing edge of harder material than that of the blades. For this reason the shovels are made easily replaceable. A secondary function resides in the fact that the shovels cut two gashes in the soil above and on opposite sides of the seed row. When the dammer is to be used with a seeder which broadcasts the seed in the furrow in the manner shown in Figures 8 and 9, the shovels are preferably removed to permit the blades 18 to operate directly on the soil.

Having thus described my invention in such full, clear, and exact terms that its construction and operation will be readily understood by others skilled in the art to which it pertains, what I claim as new and desire to secure by Letters Patent of the United States is:

1. In a tillage implement, a furrow forming plow, a flanged presser wheel in the rear of said plow for pressing the loose soil in the furrow with the surface of the pressed soil in convex form, and a scraper in the rear of said presser wheel of a width substantially the same as said presser wheel and having its operative scraping edge on substantially the level of the flanges of said presser wheel for leveling the surface of the pressed soil, and means for intermittently tripping said scraper to deposit the scraped soil in the form of dams in the furrows.

2. In a tillage implement, a furrow forming plow, a flanged presser wheel in the rear of said plow for pressing the loose soil in the furrow with the surface of the pressed soil in convex form, and a shaft and a pair of radially projecting scrapers in the rear of said presser wheel of a width substantially the same as said presser wheel and having their operative scraping edges on substantially the level of the flanges of said presser wheel for leveling the surface of the pressed soil, releasable means for latching said shaft against rotation, means for intermittently releasing said latching means to permit said scrapers to deposit the scraped soil in the form of dams in the furrows, and means engaging the bottom of the furrow for causing the partial rotation of said shaft after the release of said latching means.

3. A dammer attachment for a soil tilling implement having a wheel supported frame carrying a furrow former, said attachment including a frame and a pair of arms secured thereto and extending rearwardly therefrom, a reel rotatably mounted on the rear portions of said arms, said reel including a pair each of scraper blades and walking bars, a latch bar pivotally secured intermediate its ends to said attachment frame for movement in a vertical plane, said bar being biased into engagement with said walking bars for alternately engaging said walking bars to hold one of said scrapers at a time in operative position, a shaft adjacent said latch bar, driving connections between said last named shaft and one of the supporting wheels of the said soil tilling implement, and a trip on said last named shaft for directly engaging said latch bar on the opposite side of its pivot from the walking bar for swinging said bar away from engagement with the walking bar to permit the scraper to trip due to the pressure of the soil resulting from the forward travel of the implement.

4. A dammer attachment for a soil tilling implement having a wheel supported frame carrying a plurality of furrow openers, said attachment including a frame with means for connection to the implement frame to project rearwardly therefrom, a plurality of transverse aligning shafts journalled in said attachment frame, a plurality of reels secured to said shafts to rotate therewith, each of said reels being in alignment with a furrow opener, said reels each comprising alternately positioned dam forming blades and walking bars, pivoted latch bars on said attachment frame, means on said latch bars for engaging said walking bars one at a time for holding said reels against rotation during the forward travel of the implement, a latch releasing shaft and means responsive to the forward travel of the implement for driving said shaft, and latch releasing arms on said latch releasing shaft for intermittently engaging said pivoted latch bar, said latch releasing means being adjustable about said latch releasing shaft for the formation of the dams in either transverse elignment or nonalignment.

5. A dammer reel for trailing a furrow former, said reel including a bar constituting a pair of oppositely projecting walking bars, a shaft passing centrally through said bar, a pair of scraper blades secured tangentially to said shaft and projecting in opposite directions therefrom, and a pair of spaced apart shovels removably secured to each of said blades to project beyond the operative edge thereof.

6. In a tillage implement, a furrow forming plow, means in the rear of said plow for dropping seed into the furrow formed by said plow, a flanged presser wheel in the rear of said seed dropping means for pressing the loose soil in the furrow with the surface of the pressed soil in convex form, and a scraper in the rear of said presser wheel of a width substantially the same as said presser wheel and having its operative scraping edge on substantially the level of the flanges of said presser wheel for leveling the surface of the pressed soil, and means for intermittently tripping said scraper to deposit the scraped soil in the form of dams in the furrow.

7. In a tillage implement, a furrow forming plow, means in the rear of said plow for dropping seed in the form of a narrow row into the bottom of the furrow formed by said plow, a presser wheel in the rear of said seed dropping means for pressing the loose soil in the furrow, a scraper in the rear of said presser wheel and a pair of spaced apart shovels projecting from the operative scraping edge of said scraper for closely straddling the seed row and for leveling the surface of the pressed soil, and means for intermittently tripping said scraper to deposit the scraped soil in the form of dams in the furrow.

8. In a tillage implement, a furrow forming plow, means in the rear of said plow for dropping seed into the furrow formed by said plow, a flanged presser wheel in the rear of said seed dropping means for pressing the loose soil in the furrow with the surface of the pressed soil in convex form, and a scraper in the rear of said presser wheel of a width substantially the same as said presser wheel and having its operative scraping edge on substantially the level of the flanges of said presser wheel for leveling the surfaces of the pressed soil, means for intermittently tripping said scraper to deposit the scraped soil in the form of dams in the furrow, and means for raising and lowering said scraper with latching means to adjust the operating depth or to adjust said scraper to inoperative position.

9. A dammer attachment for a soil tilling implement having a wheel supported frame carrying a plurality of furrow openers, said attachment including a frame with means for connection to the implement frame to project rearwardly therefrom, a plurality of reels rotatably mounted on said attachment frame, each of said reels being in alignment with one of said furrow openers, said reels each comprising arcuately spaced dam forming blades, means for latching said reels at predetermined points in their rotation to hold said dam forming blades in dam forming position, an individual latch releasing means for each of said reels, means responsive to the forward travel of the implement for actuating said latch releasing means, and means for independently adjusting each of said latch releasing means with respect to its associated reel in order to provide for the formation of the dams in either transverse alignment or misalignment.

10. A dammer attachment for a soil tilling implement having a wheel supported frame carrying a plurality of furrow openers, said attachment including a frame with means for connection to the implement frame to project rearwardly therefrom, a plurality of reels rotatably mounted on said attachment frame, each of said reels being in alignment with one of said furrow openers, said reels each comprising arcuately spaced dam forming blades, means for latching said reels at predetermined points in their rotation to hold said dam forming blades in dam forming position, an individual latch releasing means for each of said reels, means responsive to the forward travel of the implement for actuating said latch releasing means, means for independently adjusting each of said latch releasing means with respect to its associated reel in order to provide for the formation of the dams in either transverse alignment or misalignment, means for adjustably raising and lowering said reels simultaneously, and latching means associated with said last named means for retaining said reels in their adjusted position.

WILLIAM ELLIOTT.